United States Patent [19]

Böhm et al.

[11] 3,921,206

[45] Nov. 18, 1975

[54] METHOD OF AND SYSTEM FOR GENERATING VIDEO SIGNALS IN COLOR TELEVISION

[75] Inventors: Kurt Böhm, Vienna; Robert Scheiber, Wiener Neudorf, both of Austria

[73] Assignees: Karl Vockenhuber; Raimund Hauser, both of Vienna, Austria

[22] Filed: Dec. 28, 1973

[21] Appl. No.: 429,695

[30] Foreign Application Priority Data

Jan. 3, 1973 Austria .................................. 44/73

[52] U.S. Cl. ........................ 358/41; 358/44; 358/12

[51] Int. Cl.²... H04N 9/04; H04N 9/07; H04N 9/32

[58] Field of Search ............. 358/11, 12, 17, 14, 18, 358/43, 44, 41, 50, 45–48, 35, 39, 30, 55; 178/DIG. 24, DIG. 3

[56] References Cited

UNITED STATES PATENTS

| | | | |
|---|---|---|---|
| 2,587,005 | 2/1952 | Smith | 358/11 |
| 3,407,265 | 10/1968 | Krause | 358/45 |
| 3,526,706 | 9/1970 | Watanabe | 358/45 |
| 3,548,092 | 12/1970 | Takagi | 358/45 |
| 3,566,017 | 2/1971 | Macovski | 358/45 |
| 3,636,244 | 1/1972 | Butler et al. | 358/17 |

*Primary Examiner*—Robert L. Griffin
*Assistant Examiner*—R. John Godfrey
*Attorney, Agent, or Firm*—Ernest G. Montague; Karl F. Ross; Herbert Dubno

[57] ABSTRACT

A photosensitive pick-up screen of a color-television camera is overlain by a strip mask through which light from an object is projected onto the screen for scanning, as by an electron beam, to produce electrical output signals in the form of discrete pulses representative of successive image dots. The strips of the mask, intersecting the lines of scan, are alternately transparent and color-selective, the latter strips suppressing alternately two additive primary colors such as red and blue so as to provide luminance signals Y and color-difference signals Y-R, Y-B in a recurrent four-pulse sequence Y / Y-R / Y / Y-B. The pulses of this sequence, separated from one another by means of timer-controlled switches, are individually delayed by one pulse length $\tau$ in a storage circuit from which they are fed to subtractors deriving first and second chrominance signals R1, B1 or R2, B2 from each color-difference signal and the immediately preceding or succeeding luminance signal. The chrominance signals R and B, besides being delivered to an outgoing transmission channel via an output matrix deriving therefrom a signal (G) for the third primary color, are combined in an adder with complementary color-difference signals Y-R and Y-B, respectively, to reconstitute the luminance signal Y during pulse periods when this signal is not directly available from the screen output so that the brightness pulses recur with a period $\tau$. A threshold circuit monitors the passing of color boundaries, appearing as sharp changes in signal strength during a pulse period, and thereupon causes the adder to switch from the first chrominance signal R1 or R2 to the second chrominance signal B1 or B2.

17 Claims, 4 Drawing Figures

METHOD OF AND SYSTEM FOR GENERATING VIDEO SIGNALS IN COLOR TELEVISION

FIELD OF THE INVENTION

Our present invention relates to a method of and a system for obtaining video signals which comprise three color signals and one luminance signal and are derived from an object image projected onto a pick-up screen which is electronically scanned through a strip mask so as to produce an electrical output containing a luminance signal alternating with color-difference signals.

STATE OF THE ART

Since, in color television, brightness generally changes more rapidly than color, is of much greater significance than the colour. A much greater band width is required for the luminance signal than for the chrominance signal. Various single-tube and twin-tube cameras have been proposed in which the color data are obtained from a color-strip mask in front of the pick-up tube. Different kinds of color-strip masks have also been developed. With the use of one or two high-frequency carriers in the video range for encoding the color, the resolution of such cameras is greatly reduced. Moreover, these methods call for great uniformity of scanning of the screen in the pick-up tube because the luminance signal is always obtained from low-frequency components of the video signal. As, the scanning characteristic for such low-frequency portions is different from that of the high-frequency components of the color carriers, this leads to difficulties in color forming.

A method, called the index method, has been proposed which utilizes a color mask with the colors black, yellow, magenta, cyan. The signals are processed by dot-sequential means, the black strip characterizing the beginning of this data quartet. However, since a total-brightness signal requires the assembling of three dots it follows that this method calls for a large number of dots if a luminance signal of sufficient band width is to be obtained.

OBJECT OF THE INVENTION

The object of our invention is to provide a simple method of and system for producing a wide-band luminance signal, together with accompanying chrominance signals, for the transmission of color-television images over an outgoing video channel.

SUMMARY OF THE INVENTION

In accordance with our present invention, the image of an object to be televised is projected upon a photosensitive screen through a mask subdivided into a multiplicity of parallel strips of different light transmissivity which are divided into groups of four with an invariable sequence, namely a first transparent strip passing all three additive primary colors (red, blue, green) of the visible spectrum, a first filter strip suppressing one primary color (red in the specific instance described hereinafter), a second transparent strip substantially identical with the first one, and a second filter strip suppressing a second primary color (here blue). The screen is electronically scanned along lines transverse to the strips, as is well known per se, by reading means such as an electron beam and associated circuitry to produce an electrical output signal composed of luminance pulses Y from the transparent strips alternating with color-difference pulses Y-R and Y-B from the filter strips, each pulse lasting for a predeterminied period $\tau$. Certain of these pulses, sequentially extracted by a distributor synchronized with the scanning sweep, are delayed for a sufficient length of time in a storage network to obtain coincidence between each color-difference pulse and an adjoining luminance pulse which are then differentially combined to produce chrominance pulses R, B representing the suppressed primary colors of the respective color-difference pulses Y-R, Y-B. The chrominance pulses R, B are thereafter additively combined with complementary color-difference pulses Y-R, Y-B, preferably the same from which they were derived in the subtraction step, to produce reconstituted luminance pulses during intervals between luminance pulses directly obtained from the electrical output signal; these reconstituted pulses are interleaved with the direrctly obtained luminance pulses to form a pulse train of recurrence period $\tau$ to be sent out along with the two chrominance signals R, B and a third chrominance signal G (green) conventionally derived from signals Y, R and B.

Normally, the delays are so chosen that the luminance pulses are differentially combined with the immediately following color-difference pulses to yield the respective chrominance pulses. This may give rise to color distortion, however, if a color boundary of the image intervenes between a luminance pulse and a color-difference pulse picked up successively from the screen. According to a further feature of our invention, therefore, we provide means for monitoring the output signal to detect the occurrence of a substantial amplitude change signifying a color boundary; in that event, switchover means controlled by the monitoring means temporarily modify the connections to the subtractors from the distributor and the storage network, thereby differentially combining a delayed color-difference pulse with an immediately following (instead of preceding) luminance pulse to produce the next chrominance pulse.

BRIEF DESCRIPTION OF THE DRAWING

The above and other features of our invention will now be described in detail with reference to the accompanying drawing in which.

In the following description only those parts of a color-television camera which are necessary for the invention are described, other parts which play no part in the invention and which are known per se being omitted in order to avoid burdening the description with unnecessary detail.

SPECIFIC DESCRIPTION

Figure 1:
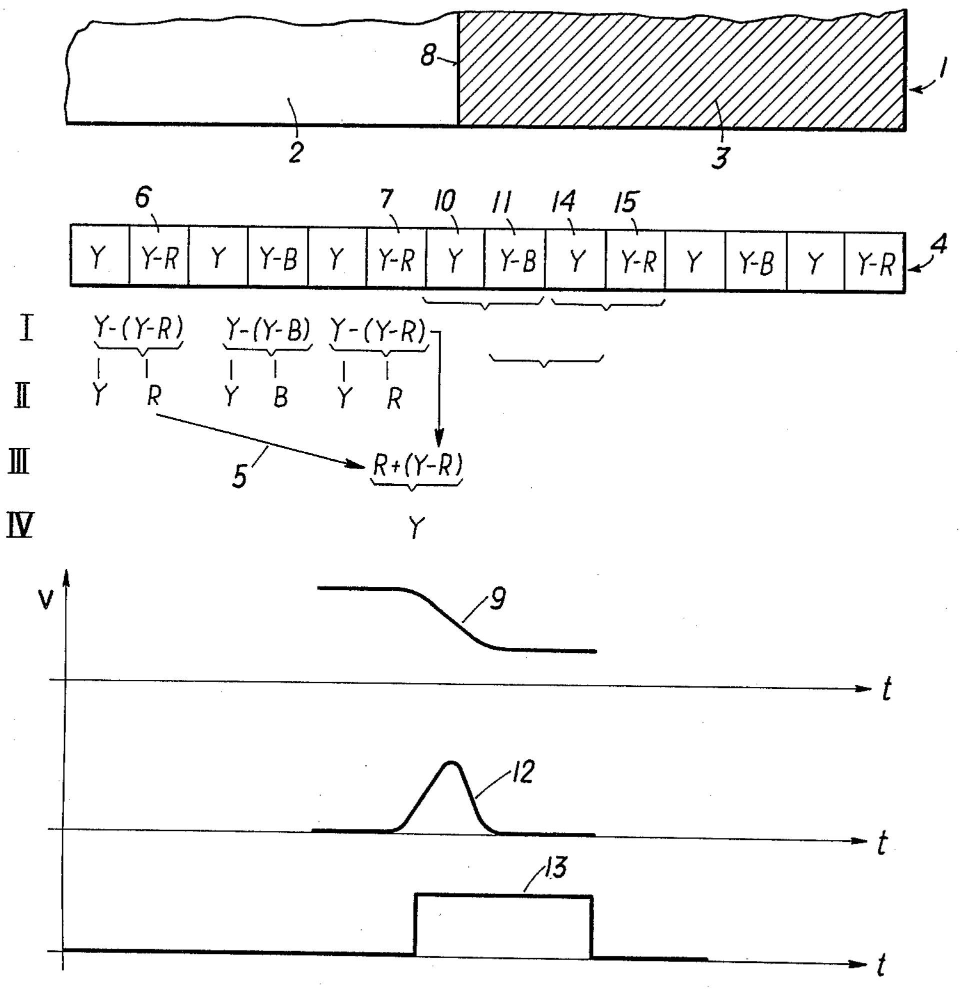
FIG. 1 shows how a projected image is broken down by a strip mask on a screen and how an electrical video output signal can be used to indicate a color boundary.

As indicated in FIG. 1, an image 1 with two differently colored areas 2, 3 is to be processed into video signals by means of a color-strip mask 4 which is only partially shown and whose width scale is expanded. The size and dimensions of such colour strip masks are adequately described in the relevant literature and need not be therefore described in detail in this context.

The essential feature of the colour strip mask 4 is that is containns transparent color-strips Y, cyan-colored strips Y-R and yellow strips Y-B. The red and blue signals may be obtained from these three sets of values by subtraction of the difference values Y-R or Y-B respectively from the luminance value Y defined by the transparent strip Y, and the green signal can be obtained in known manner by subtracting the two values thus derived from the luminance value.

From the above description it will therefore be evident that it is possible to operate with a color-strip mask which contains the data sequence

Y/Y-R/Y/Y-B in which case the Y signal must be stored for the duration of the succeeding pulse period $\tau$, i.e. the length of time allotted to the scanning of a data dot, so that one or the other of the two difference signals can be subtracted therefrom.

According to the embodiment illustrated in FIG. 1, the data sequence comprises a data quartet which includes luminance data between each pair of color data. To obtain the color data, the luminance signal Y is therefore stored during the succeeding data dot so that the next color data can be subtracted in accordance with line I of FIG. 1. As may be seen by reference to line II of FIG. 1 this subtraction alternately provides a luminance signal and a color signal, that is to say practically the complete luminance signal is obtained from one transparent strip of the mask 4 and the corresponding color signal is obtained by subtracting therefrom the signal obtained from a strip containing the difference data. The difference signal on the other hand represents an incomplete luminance signal which, in some circumstances, may be subject to the color distortion previously described.

The complete luminance signal contained in the difference data can be obtained in a further process step if, as symbolized by the arrow 5, the color signal is stored for the duration $\tau$ of an entire data sequence until the next difference signal occurs in which the corresponding color is absent and the first-mentioned color signal is subsequently added to the aforementioned difference signal in accordance with line III. The result is a luminance signal which is obtainable from either difference signal in accordance with line IV. This, however, requires that the color data in the two data sequences, i.e. in the strip 6 as well as in the strip 7 of the illustrated embodiment, be of equal magnitude. If this condition is not satisfied there is the risk of distortion. This interference is insignificant in the Y signal, appearing only as a slightly irregular color boundary. In the color signal, however, it may result in wrong color formation which must be avoided.

The risk of such wrong color formation occurs whenever a colour boundary 8 appears between the two colour areas 2 and 3 in the image 1. In the electrical output signal of the pick-up screen this is reflected by a step response 9 as shown in the graphical lower half of the Figure. Distortion must therefore be expected whenever such a step response occurs. In the illustrated embodiment the boundary 8 coincides with a transparent strip Y of the color mask 4 so that normal subtraction according to line I would result in an error because the Y value of the strip 10 is not equal to that of the strip 11. An incorrect result for the color signal would therefore be obtained by subtracting the color-difference value Y-B of the strip 11 from the luminance value Y of the strip 10.

The appearance of a step response 6 in the output signal of the pick-up screen, detected most readily by its first derivation 12, is used to trigger a change-over pulse 13 which ensures that subtraction is performed in identical manner with the signals obtained from strips 14 and 11 in place of the data pair obtained from strips 10, 11. The strips 11, 14 provide the blue signal and subsequently the red signal is obtained from the strips 14, 15. In order for a color boundary to be detected in good time it is desirable for the entire signal to be stored in order to obtain sufficient time for switching from the data pair 10, 11 which is subject to distortion, to the data pair 11, 14 which is distortion-free. The sensitivity of the circuit may then be defined by the width of the switchover pulse 13.

Figure 2A:
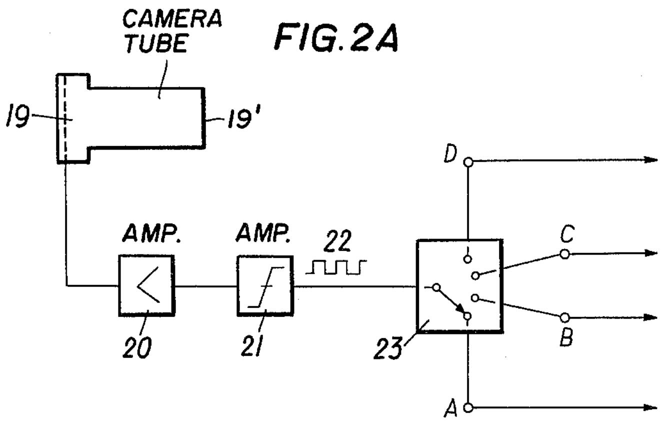
FIG. 2A diagrammatically shows a television camera tube and a distributor, synchronized with its scanning sweep, for extracting a recurrent four-pulse sequency from its output signa.
Figure 2B:
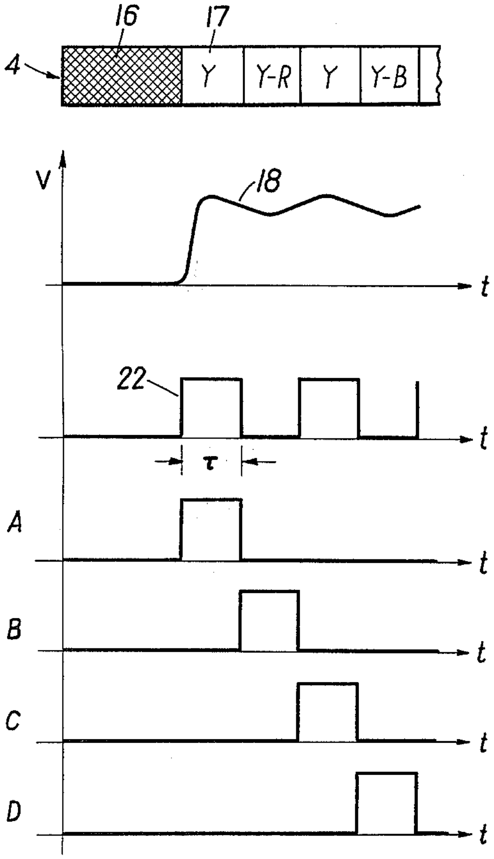
FIG. 2B is a set of graphs relating to the operation of the circuit of FIG. 2A.

To ensure clean processing of the signals it is necessary that the individual stores are switched on at the correct moments. Basically such synchronization is done by means of an oscillator whose frequency corresponds and is in phase with the strip frequency and which may therefore be utilized for actuating suitable switching means. A free-running oscillator, however, imposes very stringent requirements on the linearity of the horizontal deflection. Instead, therefore, black strips 16 are provided in the color-strip mask 4, as shown in FIG. 2B, at least at the beginning of each line and where appropriate at regular intervals along the line. These strips, with a succeeding transparent strip 17, provide a signal characteristic 18 which facilitates synchronization. The first rise of voltage amplitude after a black strip must in all cases be the first luminance signal. The signals picked up from the screen 19' of a camera tube 19 are, as shown in FIG. 2A, passed through an amplifier 20, and a limiting amplifier 21 to form a pulse sequence 22. The pulse sequence 22 is then utilized for switching a register 23 between the points A, B, C, D which provide the synchronized switching sequence illustrated graphically in the lower part of FIG. 2B. The circuit of FIG. 2A therefore constitutes a timer.

Figure 3:
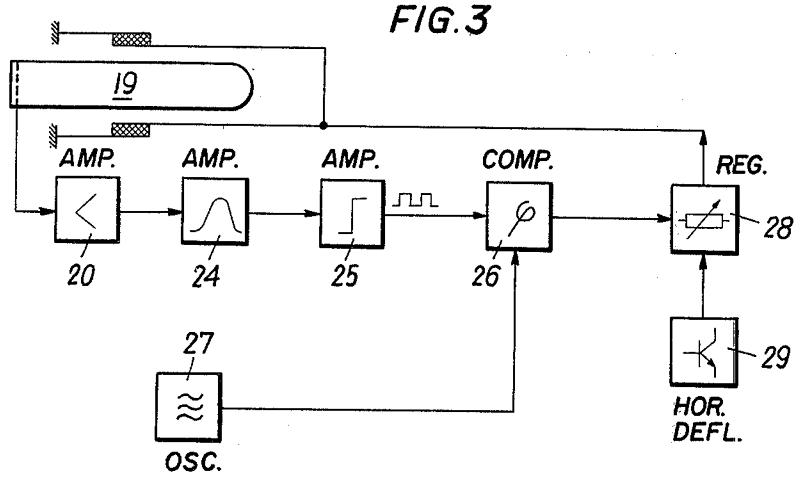
FIG. 3 shows a modification of the circuit of FIG. 2A.

Another timing arrangement is illustrated in FIG. 3. If the total number of color strips per line is selected so that the resultant frequency corresponds to the frequency of an auxiliary color carrier utilized in the system, for example 4.43 MHz, it is possible to supply this output of the pick-up tube 19 via an amplifier 20 and a selective amplifier 24 to a limiting amplifier 25 the output of which is compared in a phase-comparison stage 26 with the frequency of an oscillator 27 that operates at the frequency of, for example 4.43 MHz. The output signal of the phase-comparison stage 26 is utilized for controlling an amplitude regulator 28 for a horizontal-deflection circuit 29 of the scanning electron beam impinging on the screen 19'. This provides the additional advantage of a perfect scanning linearity. This system also requires the black strips 16. Even if the image sport at the beginning of the line is itself black, the stray light in the optical system will be sufficient to result in modulation of the output signal in order to ensure correct synchronization.

Figure 4:
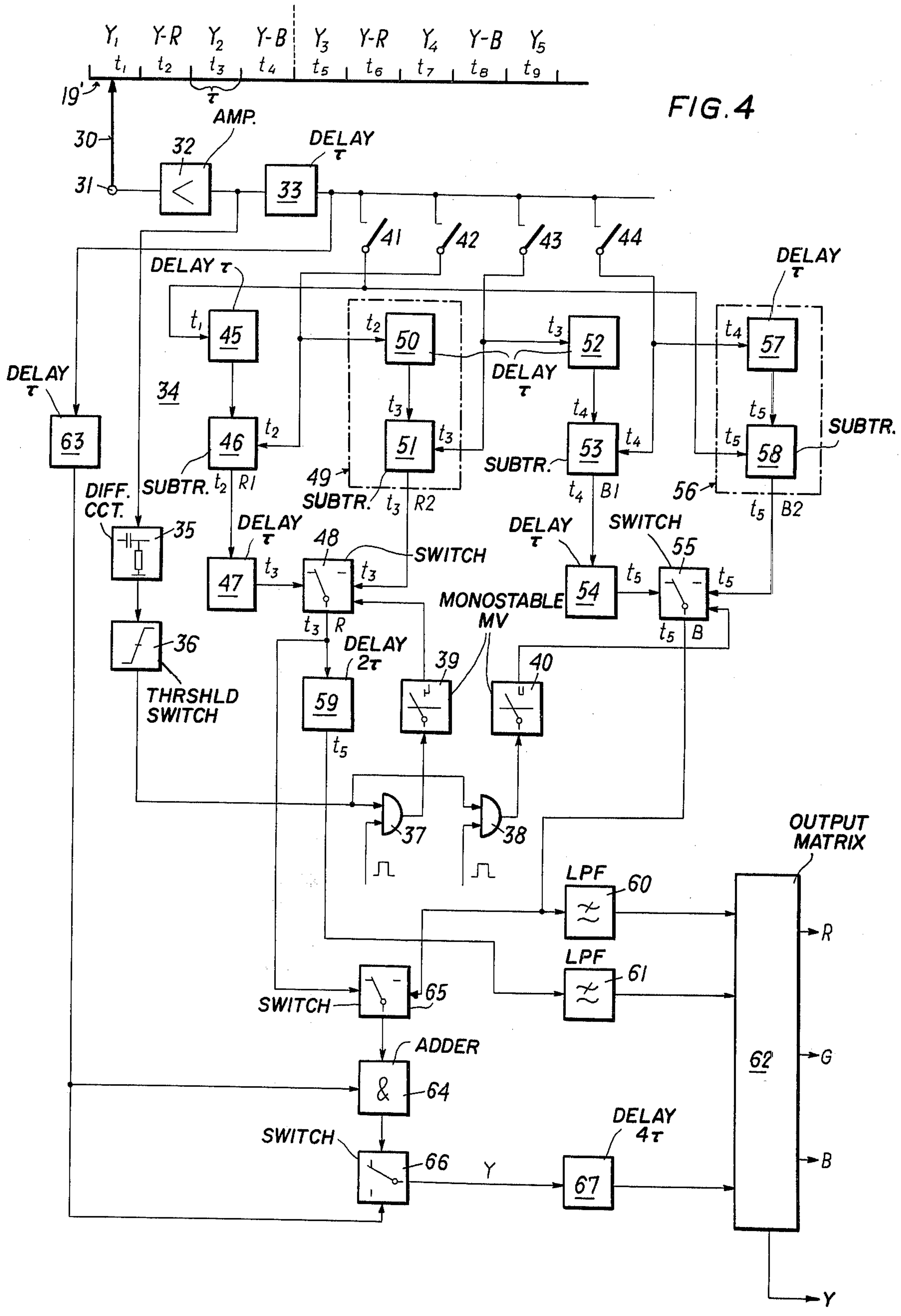
FIG. 4 is a block diagram of three parts of a color-television system which operate to provide red, green and blue video signals.

Some dots of the pick-up screen 19' are shown in symbolic form in FIG. 4. The pick-up screen 19' will usually be the photocathode of a pick-up tube 19, as shown in FIGS. 2A and 3, but it may also be a tubeless screen comprising a raster of diode lines. The term "scanning" as used in this specification applies not only to the electron-beam scanning technique conventionally employed for cathode-ray tubes but also to all devices which can be utilized to the same end in conjunction with such diode-line screens and which scan the individual diodes of the line to read their responses to incident light, under the control of a sweep circuit such as that shown at 29 in FIG. 3. The color strip mask described above is disposed in front of the pick-up screen 19' so that a set of data signals derived from this mask is correlated with to the individual dots of the pick-up screen 19. In the embodiment being described, these dots are scanned by a scanning beam 30 and the resultant video signals are obtained from a signal electrode 31.

The output signal of electrode 31 is amplified in a video amplifier 32 and is delayed in a delay circuit or store 33 by a period of time which is equal to at least the scanning duration $\tau$ of an image dot for a purpose which is to be described below.

Reference should again be made to the description relating to FIG. 1 according to which it is desirable that step responses 9 in the signal be detected in good time for the appropriate switching operation to be performed. The delay circuit or store 33, from which a conductor 34 extends to the input of a differentitating circuit 35, is adapted to detect high frequencies and to form the signal 12 (FIG. 1) in order to initiate the switching operation. The differentiation circuit 35 feeds a threshold switch 36. Two AND-networks 37, 38 are connected to the threshold switch 36, the other inputs of the networks being provided with timing pulses derived in accordance with FIG. 2B from the pulse sequence 22. The AND-networks 37, 38 supply changeover pulses 13 (FIG. 1) to trigger respective monostable multivibrator stages 39, 40. As may be seen, the AND-networks 37, 38 and the associated monostable multivibrator stages 39, 40 are respectively provided for each of the two color signals.

OPERATION

The formation of the color signals is as follows.

The output of the store 33 is connected to electronic switching stages 41, 42, 43 and 44 constituting a pulse distributor. These stages 41 to 44 are driven by the register 23, illustrated in FIG. 2A, to supply the signal at the correct time to the correct processing stages.

If it assumed that the signal $Y_1$ is initially appears in the output of the store 33 and the switching stage 41 is closed at the same moment $t_1$, the signal $Y_1$ is delivered into a second store 45 in which it is delayed until the time $t_2$.

At time $t_2$ the switching stage 41 is opened and the switching stage 42 is closed by the register 23. At the time $t_2$ and simultaneously with the output signal of the store 45 the difference signal Y-R is applied to one of two inputs of a difference former 46 which receives also the $Y_1$ signal from the second store 45 and performs the subtraction indicated in line I of FIG. 1. A first red signal R1 therefore appears at the time $t_2$ at the output of the difference former 46.

The red signal R1 is conducted via a third store 47, in which it is delayed until the time $t_3$ by an interval $\tau$ corresponding to the scanning period of one data dot, to one input of a color-selector switch 48. The selector switch 48 is driven by the output of the monostable switching stage 39 and is thus indirectly controlled by the output of the differentiating stage 35.

The other input of the selector switch 48 comprises the output of a storage device 49. The storage device 49 may contain a red signal derived from an earlier data sequence, for example the immediately preceding data sequence. Switching from the data pair of the strips 10, 11 which probably has distortion (see FIG. 1) to any adjacent pair free from distortion takes place if the differentiating stage 35 detects a step response. If the data sequence comprises only the luminance data and the two succeeding difference data, the chosen data pair may for example be the corresponding pair of an adjacent data sequence. We prefer, as already described by reference to FIG. 1, to switch to the strips 11, 14 for which purpose that the storage device 49 comprises a delay circuit or store 50 and a difference former or subtractor 51 which are analogous to the store 45 and the difference former 46.

At the time $t_2$ the store 50 receives the corresponding difference signal Y-R via the switching stage 42 simultaneously with the input of the difference former 46. This signal will then be delayed for the duration $\tau$ until the time $t_3$ when the next luminance signal $Y_2$ is obtained via the switching stage 43. It will be clear that at the time $t_3$ the switching stage 43 is open but the switching stage 42 will be closed. The luminance signal $Y_2$ then passes via the switching stage 43 to the other input of the difference former 51 whose output signal R2 is applied to the changeover switch 48, at the same time $t_3$ at which the red signal R1 is applied to the other input. The red signal R1 or the red signal R2 may thus be used alternatively, the differentiating stage 35 determining which of the two red signals is actually conducted. A red signal or chrominance pulse R is obtained in each case at the output of the changeover switch 48.

The same procedure takes place when a blue signal is formed, the $Y_2$ signal passing simultaneously into a store 52 at the time $t_3$ via the switching stage 43, the store 52 corresponding to the store 45. With a delay equal to $\tau$, namely at the time $t_4$, the signal $Y_2$ is applied to the input of a difference former 53 which in turn corresponds to the difference former 46.

At the time $t_4$ the switching stage 43 opens and the switching stage 44 closes. Simultaneously with the arrival of the output signal of the store 52 at one input of the difference former 53 via the last mentioned switching stage, the difference signal Y-B arrives at the other input of the difference former 53 which forms the blue signal B1 and at the time $t_4$ conducts it to a store 54 which corresponds to the store 47 and therefore introduces a delay again equal to $\tau$. Accordingly, the blue signal B1 arrives at one time $t_5$ at a selector switch 55, which corresponds to the selector switch 48 and is driven by the monostable switching stage 40.

At the same time $t_5$ the output signal of a storage device 56, which corresponds to the storage device 49 and carries the blue signal B2, arrives at the other input of the selector switch 55. Conveniently the storage device 56 is constructed analogously to the storage device 49 and therefore has a store 57 which corresponds to the stores 45, 50, 52 and which is supplied with the difference signal Y-B at the time $t_4$ and is adapted to deliver the difference signal at the time $t_5$ to a difference former 58 which in turn corresponds to the difference formers 46, 51, 53.

The switching stage 44 will have opened again at the time $t_5$ and the switching stage 41 will be again closed and will then deliver the luminance signal $Y_3$ to the store 45 to form the red signal R1 and is also to the difference former 58 to form a blue signal B2.

The blue signal or chrominance pulse B appears at the time $t_5$ on the output of the selector switch 55. In order to obtain the green signal it is necessary for it to be processed together with the red signal R but this is already available at the output of the selector switch 48 at the time $t_3$. It is therefore necessary to connect the output of the selector switch 48 to the input of a further store 59 which delays the red signal R by a period 2 $\tau$, i.e. until the time $t_5$. These two color signals are conducted through respective low-pass filters 60, 61 and are subsequently processed in known manner in an output matrix 62 so that the red signal R, the green signal G and the blue signal B are available at the output of that matrix.

Line III of FIG. 1 indicates the manner in which the luminance signal can also be obtained from the difference data. According to FIG. 4 this is achieved by connecting to the output of the store 33 a further store 63 in parallel with the switching stages 41 to 44 which ensures that the signals that are obtained by a color strip can be completed within the correct time to form the luminance signal with the missing color signal R or B by means of a selector switch 65 with timed operation. To this end it is important that the red signal R reaches one input of the selector switch 65 at the time $t_3$, simultaneously with the appearance of signal Y-R in the output of store 63, and the blue signal B reaches the other input of the selector switch at the time $t_5$ when store 63 delivers the signal Y-B. The selector switch 65 must therefore connect the correct input to its output at each of these instants for delivery of the corresponding signal to an adding stage 64 also connected to a selector switcih 66 which on the other hand transfers the luminance signal Y, obtained directly from the store 63, to its output and on the other hand supplies to that output the reconstituted luminance signal obtained from the output of the adding stage 64. The fact that the pure Y signal is supplied to the adding stage 64 does not result in any interference because the selector switch 66 is not connected to the output of this adding stage but to the output of the store 63 at that particular time.

Since the two chrominance signals B and R appear only once every four pulses at the inputs of their respective filters 60 and 61, namely at time $t_5$, their recurrence period is equal to $4\tau$. In order tht the integrated chrominance signals in the outputs of these filters be properly synchronized with the luminance pulses of recurrence period $\tau$ from switch 66, we insert between this switch and the output matrix 62 a further store of the same delay period $4\tau$, supplementing the delay $\tau$ introduced by the store 63.

We claim:

1. A system for generating luminance and color signals for the transmission of color-television images over an outgoing video channel, comprising:

a photosensitive screen adapted to receive the projected image of an object;

a mask interposed between said screen and the location of said object, said mask being subdivided into a multiplicity of parallel strips of different light transmissivity, said strips being divided into groups of four with an invariable sequence of a first transparent strip passing all three additive primary colors of the visible spectrum, a first filter strip suppressing one of said primary colors, a second transparent strip substantially identical with said first transparent strip, and a second filter strip suppressing another of said primary colors;

electronic reading means provided with sweep means for scanning said screen along lines transverse to said strips to produce an electrical output signal composed of luminance pulses from said transparent strips alternating with color-difference pulses from said filter strips, each of said pulses lasting for a predetermined period;

distributor means synchronized with said sweep means and connected to said reading means for successively extracting said pulses from said output signal;

storage means connected to said distributor means for delaying certain of said pulses to obtain coincidence between each color-difference pulse and an adjoining luminance pulse;

subtractor means connected to said distributor means and said storage means for differentially combining the coincident color-difference and luminance pulses to produce chrominance pulse representing the suppressed primary colors of the respective color-difference pulses;

adder means with input connections to said reading means and said substractor means for combining said chrominance pulses with complementary color-difference pulses to produce reconstituted luminance pulses during intervals between luminance pulses directly obtained from said output signal; and switch means connected to said adder means and said reading means for interleaving said directly obtained luminance pulses with said reconstituted luminance pulses.

2. A system as defined in claim 1 wherein the delay of said storage means is of such magnitude that a given color-difference pulse fed jointly with a luminance pulse to said subtractor means reaches said adder means together with the resulting chrominance pulse.

3. A system as defined in claim 2 wherein said subtractor means is connected to receive said luminance pulses from said distributor means through said storage means with a delay enabling differential combination thereof with the immediately following color-difference pulse.

4. A system as defined in claim 3, further comprising monitoring means connected to said reading means for detecting the occurrence of a substantial amplitude change in said output signal, indicative of a color boundary in the projected image, and switchover means controlled by said monitoring means for temporarily modifying the connections from said distributor means and said storage means to said subtractor means for differentially combining a delayed color-difference pulse with an immediately following luminance pulse to produce the next chrominance pulse.

5. A system as defined in claim 4, further comprising a delay network with a delay equal to at least one pulse period inserted between said reading means and said distributor means, said monitoring means being connected to said reading means upstream of said delay network.

6. A system as defined in claim 1 wherein said filter strips are cyan and yellow.

7. A system as defined in claim 1, further comprising an output matrix connected to said switch means and said subtractor means for receiving said luminance and chrominance pulses and for deriving therefrom chrominance signals for the third one of said primary colors.

8. A system as defined in claim 7 wherein the connection between said substractor means and said output matrix includes low-pass filter means for integrating said chrominance pulses.

9. A system as defined in claim 8 wherein the connection between said switch means and said output matrix includes a storage network with a delay period substantially equaling the recurrence period of said chrominance pulses.

10. A system as defined in claim 1 wherein said sweep means comprises a deflection circuit, a high-frequency oscillator, phase-comparison means connected to said reading means and to said oscillator, and control means for said deflection circuit connected to said phase-comparison means.

11. A method of generating luminance and color signals for the transmission of color-television images over an outgoing video channel, comprising the steps of:

a. projecting the image of an object upon a photosensitive screen through a mask subdivided into a multiplicity of parallel strips of different light transmissivitiy, said strips being divided into groups of four with an invariable sequence of a first transparent strip passing all three additive primary colors of the visible spectrum, a first filter strip suppressing one of said primary colors, a second transparent strip substantially identical with said first transparent strip, and a second filter strip suppressing another of said primary colors;

b. electronically scanning said screen along lines transverse to said strips to produce an electrical output signal composed of luminance pulses from said transparent strips alternating with color-difference pulses from said filter strips, each of said pulses lasting for a predetermined period;

c. delaying certain of said pulses obtaining coincidence between each color-difference pulse and an adjoining luminance pulses;

d. differentially combining the coincident color-difference and luminance pulses to produce chrominance pulses representing the suppressed primary colors of the respective color-difference pulses;

e. additively combining said chrominance pulses with complementary color-difference pulses to produce reconstituted luminance pulses during intervals between luminance pulses directly obtained from said output signal; and f. interleaving said directly obtained luminance pulses with said reconstituted luminance pulses.

12. A method as defined in claim 11 wherein said complementary color-difference pulses are the same from which the chrominance pulses combined therewith in step (e) have been derived in step (d).

13. A method as defined in claim 12 wherein said luminance pulses are delayed in step (c) for a sufficient time to enable their differential combination with the immediately following color-difference pulses in step (d).

14. A method as defined in claim 13, comprising the further step of (g) monitoring said output signal to detect the occurrence of a substantial amplitude change signifying a color boundary in the prejected image and, upon detecting such amplitude change, differentially combining in step (d) a delayed color-difference pulse with an immediately following luminance pulse to produce the next chrominance pulse.

15. A method as defined in claim 14 wherein the output signal is delayed, after the monitoring step (g), for at least on pulse period before extraction of said luminance and color-difference pulses therefrom in step (b).

16. A method as defined in claim 11 wherein the primary colors suppressed in step (a) are red and blue.

17. A method as defined in claim 11, comprising the further step of deriving chrominance signals for the third one of said primary colors from the chrominance pulses produced in step (d) and the interleaved luminance pulses of step (f).

* * * * *